UNITED STATES PATENT OFFICE.

JAMES M. SNELUS, OF NILES, OHIO.

PLASTER COMPOSITION.

No. 841,464.    Specification of Letters Patent.    Patented Jan. 15, 1907.

Application filed April 17, 1906. Serial No. 312,245.

*To all whom it may concern:*

Be it known that I, JAMES M. SNELUS, of Niles, in the county of Trumbull and State of Ohio, have invented certain new and useful Improvements in Plaster Compositions; and I do hereby declare the following to be a full, clear, and exact description of the invention, such as will enable others skilled in the art to which it appertains to make and use the same.

In plaster compositions heretofore used difficulty has been experienced by reason of the fact that the outer or white coating is caused to dry too quickly, resulting in cracking. This is due to the rapid absorption of moisture by the plaster compound.

The primary object of my invention is to provide a plaster composition which will not take off the moisture of the outer coating.

Other objects are to provide a plaster composition which will possess great pliability, allowing of settling of the wall without causing breaks, and which will present a surface to which the top coating will readily adhere.

The invention will be hereinafter fully set forth, and particularly pointed out in the claims.

My composition consists of the following ingredients in approximately the proportions specified: cement, twenty pounds; plaster-of-paris, four pounds; shavings, two pounds, six ounces; pig-hair, one-half ounce; manila fiber, one-half ounce; soap, one-fourth ounce; salt, one ounce; cow-manure, one-sixteenth ounce. The parts are by weight and not by bulk.

In preparing my plaster composition the shavings are treated with salt water as security against burning and then mixed with the other ingredients while wet, all being treated with salt-water. The shavings render the plaster exceedingly light. I have found by actual pactice that a composition of the ingredients specified will not absorb the moisture of the outer coating, but will permit the latter to dry without interference.

This composition is also designed to be used in the making of plaster-boards, which are secured in position by nails or wires.

Aside from the other advantages above mentioned, a plaster-board made in accordance with my invention may be produced for about one-half the cost of those now in use.

I claim as my invention—

1. The herein-described composition of matter comprising cement, plaster-of-paris, shavings, pig-hair, fiber, soap, salt and cow-manure.

2. The herein-described composition of matter comprising cement, plaster-of-paris, shavings, pig-hair, fiber, soap and cow-manure, all mixed in salt water.

In testimony whereof I have signed this specification in the presence of two subscribing witnesses.

JAMES M. SNELUS.

Witnesses:
FRANCIS S. MAGUIRE,
VERNON E. WEST.